(12) United States Patent
Mahan et al.

(10) Patent No.: US 9,024,957 B1
(45) Date of Patent: May 5, 2015

(54) ADDRESS INDEPENDENT SHADER PROGRAM LOADING

(75) Inventors: Justin Michael Mahan, Fremont, CA (US); Edward A. Hutchins, Mountain View, CA (US); Michael J. M. Toksvig, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 919 days.

(21) Appl. No.: 11/893,427

(22) Filed: Aug. 15, 2007

(51) Int. Cl.
*G06F 13/00* (2006.01)
*G06F 9/445* (2006.01)

(52) U.S. Cl.
CPC .................................. *G06F 8/61* (2013.01)

(58) Field of Classification Search
USPC .......................................... 345/503, 537, 538
See application file for complete search history.

(56) References Cited

U.S. PATENT DOCUMENTS

| | | |
|---|---|---|
| 3,091,657 A | 5/1963 | Stuessel |
| 3,614,740 A | 10/1971 | Delagi et al. |
| 3,987,291 A | 10/1976 | Gooding et al. |
| 4,101,960 A | 7/1978 | Stokes et al. |
| 4,541,046 A | 9/1985 | Nagashima et al. |
| 4,566,005 A | 1/1986 | Apperley et al. |
| 4,748,585 A | 5/1988 | Chiarulli et al. |
| 4,897,717 A | 1/1990 | Hamilton et al. |
| 4,958,303 A | 9/1990 | Assarpour et al. |
| 4,965,716 A | 10/1990 | Sweeney |
| 4,965,751 A | 10/1990 | Thayer et al. |
| 4,985,848 A | 1/1991 | Pfeiffer et al. |
| 5,040,109 A | 8/1991 | Bowhill et al. |
| 5,047,975 A | 9/1991 | Patti et al. |
| 5,175,828 A | 12/1992 | Hall et al. |
| 5,179,530 A | 1/1993 | Genusov et al. |
| 5,197,130 A | 3/1993 | Chen et al. |
| 5,210,834 A | 5/1993 | Zurawski et al. |
| 5,263,136 A | 11/1993 | DeAguiar et al. |
| 5,327,369 A | 7/1994 | Ashkenazi |
| 5,357,623 A | 10/1994 | Megory-Cohen |
| 5,375,223 A | 12/1994 | Meyers et al. |
| 5,388,206 A | 2/1995 | Poulton et al. |
| 5,388,245 A | 2/1995 | Wong |
| 5,418,973 A | 5/1995 | Ellis et al. |
| 5,430,841 A | 7/1995 | Tannenbaum et al. |
| 5,430,884 A | 7/1995 | Beard et al. |
| 5,432,905 A | 7/1995 | Hsieh et al. |
| 5,517,666 A | 5/1996 | Ohtani et al. |
| 5,522,080 A | 5/1996 | Harney |

(Continued)

FOREIGN PATENT DOCUMENTS

| | | |
|---|---|---|
| DE | 29606102 | 6/1996 |
| JP | 07-101885 | 4/1995 |

(Continued)

OTHER PUBLICATIONS

McCool et al.; Shader metaprogramming; SIGGRAPH 2002; pp. 57-68.*

(Continued)

*Primary Examiner* — Maurice L McDowell, Jr.
*Assistant Examiner* — Kyle Zhai

(57) ABSTRACT

A method for loading a shader program from system memory into GPU memory. The method includes accessing the shader program in system memory of a computer system. A DMA transfer of the shader program from system memory into GPU memory is performed such that the shader program is loaded into GPU memory in an address independent manner.

14 Claims, 5 Drawing Sheets

(56) References Cited

U.S. PATENT DOCUMENTS

| | | | |
|---|---|---|---|
| 5,560,030 A | 9/1996 | Guttag et al. | |
| 5,561,808 A | 10/1996 | Kuma et al. | |
| 5,574,944 A | 11/1996 | Stager | |
| 5,627,988 A | 5/1997 | Oldfield | |
| 5,644,753 A | 7/1997 | Ebrahim et al. | |
| 5,649,173 A | 7/1997 | Lentz | |
| 5,666,169 A | 9/1997 | Ohki et al. | |
| 5,682,552 A | 10/1997 | Kuboki et al. | |
| 5,682,554 A | 10/1997 | Harrell | |
| 5,706,478 A * | 1/1998 | Dye | 345/503 |
| 5,754,191 A | 5/1998 | Mills et al. | |
| 5,761,476 A | 6/1998 | Martell | |
| 5,764,243 A | 6/1998 | Baldwin | |
| 5,784,590 A | 7/1998 | Cohen et al. | |
| 5,784,640 A | 7/1998 | Asghar et al. | |
| 5,796,974 A | 8/1998 | Goddard et al. | |
| 5,802,574 A | 9/1998 | Atallah et al. | |
| 5,809,524 A | 9/1998 | Singh et al. | |
| 5,812,147 A | 9/1998 | Van Hook et al. | |
| 5,835,788 A | 11/1998 | Blumer et al. | |
| 5,848,254 A | 12/1998 | Hagersten | |
| 5,920,352 A | 7/1999 | Inoue | |
| 5,925,124 A | 7/1999 | Hilgendorf et al. | |
| 5,940,090 A | 8/1999 | Wilde | |
| 5,940,858 A | 8/1999 | Green | |
| 5,949,410 A | 9/1999 | Fung | |
| 5,950,012 A | 9/1999 | Shiell et al. | |
| 5,978,838 A | 11/1999 | Mohamed et al. | |
| 5,999,199 A | 12/1999 | Larson | |
| 6,009,454 A | 12/1999 | Dummermuth | |
| 6,016,474 A | 1/2000 | Kim et al. | |
| 6,041,399 A | 3/2000 | Terada et al. | |
| 6,049,672 A | 4/2000 | Shiell et al. | |
| 6,073,158 A | 6/2000 | Nally et al. | |
| 6,092,094 A | 7/2000 | Ireton | |
| 6,108,766 A | 8/2000 | Hahn et al. | |
| 6,112,019 A | 8/2000 | Chamdani et al. | |
| 6,131,152 A | 10/2000 | Ang et al. | |
| 6,141,740 A | 10/2000 | Mahalingaiah et al. | |
| 6,144,392 A | 11/2000 | Rogers | |
| 6,150,610 A | 11/2000 | Sutton | |
| 6,189,068 B1 | 2/2001 | Witt et al. | |
| 6,192,073 B1 | 2/2001 | Reader et al. | |
| 6,192,458 B1 | 2/2001 | Arimilli et al. | |
| 6,208,361 B1 | 3/2001 | Gossett | |
| 6,209,078 B1 | 3/2001 | Chiang et al. | |
| 6,222,552 B1 | 4/2001 | Haas et al. | |
| 6,230,254 B1 | 5/2001 | Senter et al. | |
| 6,239,810 B1 | 5/2001 | Van Hook et al. | |
| 6,247,094 B1 | 6/2001 | Kumar et al. | |
| 6,252,610 B1 | 6/2001 | Hussain | |
| 6,292,886 B1 | 9/2001 | Makineni et al. | |
| 6,301,600 B1 | 10/2001 | Petro et al. | |
| 6,314,493 B1 | 11/2001 | Luick | |
| 6,317,819 B1 | 11/2001 | Morton | |
| 6,351,808 B1 | 2/2002 | Joy et al. | |
| 6,370,617 B1 | 4/2002 | Lu et al. | |
| 6,437,789 B1 | 8/2002 | Tidwell et al. | |
| 6,438,664 B1 | 8/2002 | McGrath et al. | |
| 6,480,927 B1 | 11/2002 | Bauman | |
| 6,490,654 B2 | 12/2002 | Wickeraad et al. | |
| 6,496,902 B1 | 12/2002 | Faanes et al. | |
| 6,499,090 B1 | 12/2002 | Hill et al. | |
| 6,525,737 B1 | 2/2003 | Duluk, Jr. et al. | |
| 6,529,201 B1 | 3/2003 | Ault et al. | |
| 6,597,357 B1 | 7/2003 | Thomas | |
| 6,603,481 B1 | 8/2003 | Kawai et al. | |
| 6,624,818 B1 | 9/2003 | Mantor et al. | |
| 6,629,188 B1 | 9/2003 | Minkin et al. | |
| 6,631,423 B1 | 10/2003 | Brown et al. | |
| 6,631,463 B1 | 10/2003 | Floyd et al. | |
| 6,657,635 B1 | 12/2003 | Hutchins et al. | |
| 6,658,447 B2 | 12/2003 | Cota-Robles | |
| 6,674,841 B1 | 1/2004 | Johns et al. | |
| 6,700,581 B2 * | 3/2004 | Baldwin et al. | 345/519 |
| 6,700,588 B1 | 3/2004 | MacInnis et al. | |
| 6,715,035 B1 | 3/2004 | Colglazier et al. | |
| 6,732,242 B2 | 5/2004 | Hill et al. | |
| 6,809,732 B2 | 10/2004 | Zatz et al. | |
| 6,812,929 B2 | 11/2004 | Lavelle et al. | |
| 6,825,843 B2 | 11/2004 | Allen et al. | |
| 6,825,848 B2 | 11/2004 | Fu et al. | |
| 6,839,062 B2 | 1/2005 | Aronson et al. | |
| 6,862,027 B2 | 3/2005 | Andrews et al. | |
| 6,891,543 B2 | 5/2005 | Wyatt | |
| 6,915,385 B1 | 7/2005 | Leasure et al. | |
| 6,944,744 B2 | 9/2005 | Ahmed et al. | |
| 6,952,214 B2 | 10/2005 | Naegle et al. | |
| 6,965,982 B2 | 11/2005 | Nemawarkar | |
| 6,975,324 B1 | 12/2005 | Valmiki et al. | |
| 6,976,126 B2 | 12/2005 | Clegg et al. | |
| 6,978,149 B1 | 12/2005 | Morelli et al. | |
| 6,978,457 B1 | 12/2005 | Johl et al. | |
| 6,981,106 B1 | 12/2005 | Bauman et al. | |
| 6,985,151 B1 | 1/2006 | Bastos et al. | |
| 7,015,909 B1 | 3/2006 | Morgan, III et al. | |
| 7,031,330 B1 | 4/2006 | Bianchini, Jr. | |
| 7,032,097 B2 | 4/2006 | Alexander et al. | |
| 7,035,979 B2 | 4/2006 | Azevedo et al. | |
| 7,091,979 B1 * | 8/2006 | Donovan | 345/530 |
| 7,148,888 B2 | 12/2006 | Huang | |
| 7,151,544 B2 | 12/2006 | Emberling | |
| 7,154,500 B2 | 12/2006 | Heng et al. | |
| 7,159,212 B2 | 1/2007 | Schenk et al. | |
| 7,185,178 B1 | 2/2007 | Barreh et al. | |
| 7,202,872 B2 | 4/2007 | Paltashev et al. | |
| 7,260,677 B1 | 8/2007 | Vartti et al. | |
| 7,305,540 B1 | 12/2007 | Trivedi et al. | |
| 7,321,787 B2 | 1/2008 | Kim | |
| 7,334,110 B1 | 2/2008 | Faanes et al. | |
| 7,369,815 B2 | 5/2008 | Kang et al. | |
| 7,373,478 B2 | 5/2008 | Yamazaki | |
| 7,406,698 B2 | 7/2008 | Richardson | |
| 7,412,570 B2 | 8/2008 | Moll et al. | |
| 7,486,290 B1 | 2/2009 | Kilgariff et al. | |
| 7,487,305 B2 | 2/2009 | Hill et al. | |
| 7,493,452 B2 | 2/2009 | Eichenberger et al. | |
| 7,528,843 B1 * | 5/2009 | Kilgard et al. | 345/582 |
| 7,545,381 B2 | 6/2009 | Huang et al. | |
| 7,564,460 B2 | 7/2009 | Boland et al. | |
| 7,636,087 B2 * | 12/2009 | Takahashi et al. | 345/418 |
| 7,750,913 B1 | 7/2010 | Parenteau et al. | |
| 7,777,748 B2 | 8/2010 | Bakalash et al. | |
| 7,852,341 B1 | 12/2010 | Rouet et al. | |
| 7,869,835 B1 | 1/2011 | Zu | |
| 8,020,169 B2 | 9/2011 | Yamasaki | |
| 8,411,096 B1 | 4/2013 | Mahan et al. | |
| 8,659,601 B1 | 2/2014 | Mahan et al. | |
| 8,698,819 B1 | 4/2014 | Mahan et al. | |
| 2001/0026647 A1 | 10/2001 | Morita | |
| 2002/0116595 A1 | 8/2002 | Morton | |
| 2002/0130874 A1 | 9/2002 | Baldwin | |
| 2002/0144061 A1 | 10/2002 | Faanes et al. | |
| 2002/0194430 A1 | 12/2002 | Cho | |
| 2003/0001847 A1 | 1/2003 | Doyle et al. | |
| 2003/0003943 A1 | 1/2003 | Bajikar | |
| 2003/0014457 A1 | 1/2003 | Desai et al. | |
| 2003/0016217 A1 | 1/2003 | Vlachos et al. | |
| 2003/0016844 A1 | 1/2003 | Numaoka | |
| 2003/0031258 A1 | 2/2003 | Wang et al. | |
| 2003/0067473 A1 | 4/2003 | Taylor et al. | |
| 2003/0172326 A1 | 9/2003 | Coffin, III et al. | |
| 2003/0188118 A1 | 10/2003 | Jackson | |
| 2003/0204673 A1 | 10/2003 | Venkumahanti et al. | |
| 2003/0204680 A1 | 10/2003 | Hardage, Jr. | |
| 2003/0227461 A1 | 12/2003 | Hux et al. | |
| 2004/0003370 A1 * | 1/2004 | Schenk et al. | 717/100 |
| 2004/0012597 A1 | 1/2004 | Zatz et al. | |
| 2004/0073771 A1 | 4/2004 | Chen et al. | |
| 2004/0073773 A1 | 4/2004 | Demjanenko | |
| 2004/0103253 A1 | 5/2004 | Kamei et al. | |
| 2004/0193837 A1 | 9/2004 | Devaney et al. | |
| 2004/0205326 A1 | 10/2004 | Sindagi et al. | |
| 2004/0212730 A1 | 10/2004 | MacInnis et al. | |

(56) References Cited

U.S. PATENT DOCUMENTS

| | | | |
|---|---|---|---|
| 2004/0215887 A1 | 10/2004 | Starke | |
| 2004/0221117 A1 | 11/2004 | Shelor | |
| 2004/0237074 A1* | 11/2004 | Aronson et al. | 717/158 |
| 2004/0263519 A1 | 12/2004 | Andrews et al. | |
| 2005/0012759 A1 | 1/2005 | Valmiki et al. | |
| 2005/0024369 A1 | 2/2005 | Xie | |
| 2005/0030312 A1* | 2/2005 | Boyd et al. | 345/522 |
| 2005/0071722 A1 | 3/2005 | Biles | |
| 2005/0088448 A1 | 4/2005 | Hussain et al. | |
| 2005/0122330 A1* | 6/2005 | Boyd et al. | 345/501 |
| 2005/0239518 A1 | 10/2005 | D'Agostino et al. | |
| 2005/0262332 A1 | 11/2005 | Rappoport et al. | |
| 2005/0280652 A1 | 12/2005 | Hutchins et al. | |
| 2006/0020843 A1 | 1/2006 | Frodsham et al. | |
| 2006/0064517 A1 | 3/2006 | Oliver | |
| 2006/0064547 A1 | 3/2006 | Kottapalli et al. | |
| 2006/0103659 A1 | 5/2006 | Karandikar et al. | |
| 2006/0152509 A1* | 7/2006 | Heirich | 345/426 |
| 2006/0152519 A1 | 7/2006 | Hutchins et al. | |
| 2006/0152520 A1 | 7/2006 | Gadre et al. | |
| 2006/0176308 A1 | 8/2006 | Karandikar et al. | |
| 2006/0176309 A1 | 8/2006 | Gadre et al. | |
| 2006/0221076 A1* | 10/2006 | Takahashi et al. | 345/427 |
| 2007/0076010 A1 | 4/2007 | Swamy et al. | |
| 2007/0130444 A1 | 6/2007 | Mitu et al. | |
| 2007/0285427 A1 | 12/2007 | Morein et al. | |
| 2008/0007559 A1* | 1/2008 | Kalaiah et al. | 345/501 |
| 2008/0016327 A1 | 1/2008 | Menon et al. | |
| 2008/0077793 A1* | 3/2008 | Tan et al. | 713/168 |
| 2008/0147993 A1* | 6/2008 | Kaneko | 711/147 |
| 2008/0278509 A1* | 11/2008 | Washizu et al. | 345/522 |
| 2009/0235051 A1 | 9/2009 | Codrescu et al. | |
| 2012/0023149 A1 | 1/2012 | Kinsman et al. | |

FOREIGN PATENT DOCUMENTS

| | | |
|---|---|---|
| JP | H08-077347 | 3/1996 |
| JP | H08-153032 | 6/1996 |
| JP | 08-297605 | 12/1996 |
| JP | 09-287217 | 11/1997 |
| JP | H09-325759 | 12/1997 |
| JP | 10-222476 | 8/1998 |
| JP | 11-190447 | 7/1999 |
| JP | 2000-148695 | 5/2000 |
| JP | 2001-022638 | 1/2001 |
| JP | 2003-178294 | 6/2003 |
| JP | 2004-252990 | 9/2004 |
| KR | 100262453 | 5/2000 |
| KR | 1998-018215 | 8/2000 |
| TW | 413766 | 12/2000 |
| TW | 436710 | 5/2001 |
| TW | 442734 | 6/2001 |

OTHER PUBLICATIONS

Tarditi et al.; Accelerator: using data parallelism to program GPUs for general-purpose uses; Dec. 2006; ACM; vol. 40, Issue 5; pp. 325-335.*
IBM TDB, Device Queue Management, vol. 31 Iss. 10, pp. 45-50, Mar. 1, 1989.
Hamacher, V. Carl et al., Computer Organization, Second Edition, McGraw Hill, 1984, pp. 1-9.
Graham, Susan L. et al., Getting Up to Speed: The future of Supercomputing, the National Academies Press, 2005, glossary.
Rosenberg, Jerry M., Dictionary of Computers, Information Processing & Telecommunications, 2nd Edition, John Wiley & Sons, 1987, pp. 102 and 338.
Rosenberg, Jerry M., Dictionary of Computers, Information Processing & Telecommunications, 2nd Edition, John Wiley & Sons, 1987, pp. 305.
Graf, Rudolf F., Modern Dictionary of Electronics, Howard W. Sams & Company, 1988, pp. 273.
Graf, Rudolf F., Modern Dictionary of Electronics, Howard W. Sams & Company, 1984, pp. 566.
Wikipeida, definition of "subroutine", published Nov. 29, 2003, four pages.
Graston et al. (Software Pipelining Irregular Loops On the TMS320C6000 VLIW DSP Architecture); Proceedings of the ACM SIGPLAN workshop on Languages, compilers and tools for embedded systems; pp. 138-144; Year of Publication: 2001.
SearchStorage.com Definitions, "Pipeline Burst Cache," Jul. 31, 2001, url: http://searchstorage.techtarget.com/sDefinition/0,sid5_gci214414,00.html.
"Vertex Fog"; http://msdn.microsoft.com/library/en-us/directx9_c/Vertex_fog.asp?frame=true; Mar. 27, 2006.
"Anti-aliasing"; http://en.wikipedia.org/wiki/Anti-aliasing; Mar. 27, 2006.
"Alpha Testing State"; http://msdn.microsoft.com/library/en-us/directx9_c/directx/graphics/programmingguide/GettingStarted/Direct3Kdevices/States/renderstates/alphatestingstate.asp; Mar. 25, 2005.
Brown, Brian; "Data Structure And Number Systems"; 2000; http://www.ibilce.unesp.br/courseware/datas/data3.htm; 2000.
Heirich; Optimal Automatic Mulit-pass Shader Partitioning by Dynamic Programming; Eurographics—Graphics Hardware (2005); Jul. 2005.
Hutchins E., SC10: A Video Processor And Pixel-Shading GPU for Handheld Devices; presented at the Hot Chips conferences on Aug. 23, 2004.
Wilson D., NVIDIA's Tiny 90nm G71 and G73: GeForce 7900 and 7600 Debut; at http://www.anandtech.com/show/1967/2; dated Sep. 3, 2006, retrieved Jun. 16, 2011.
Woods J., Nvidia GeForce FX Preview, at http://www.tweak3d.net/reviews/nvidia/nv30preview/1.shtml; dated Nov. 18, 2002; retrieved Jun. 16, 2011.
NVIDIA Corporation, Technical Brief: Transform and Lighting; dated 1999; month unknown.
Merriam-Webster Dictionary Online; Definition for "program"; retrieved Dec. 14, 2010.
Gadre, S., Patent Application Entitled "Video Processor Having Scalar and Vector Components With Command FIFO for Passing Function Calls From Scalar to Vector", U.S. Appl. No. 11/267,700, filed Nov. 4, 2005.
Gadre, S., Patent Application Entitled "Stream Processing in a Video Processor", U.S. Appl. No. 11/267,599, filed Nov. 4, 2005.
Karandikar et al., Patent Application Entitled: "Multidemnsional Datapath Processing in a Video Processor", U.S. Appl. No. 11/267,638, filed Nov. 4, 2005.
Karandikar et al., Patent Application Entitled: "A Latency Tolerant System for Executing Video Processing Operations", U.S. Appl. No. 11/267,875, filed Nov. 4, 2005.
Gadre, S., Patent Application Entitled "Separately Schedulable Condition Codes For a Video Processor", U.S. Appl. No. 11/267,793, filed Nov. 4, 2005.
Lew, et al., Patent Application Entitled "A Programmable DMA Engine for Implementing Memory Transfers for a Video Processor", U.S. Appl. No. 11/267,777, filed Nov. 4, 2005.
Karandikar et al., Patent Application Entitled: "A Pipelined L2 Cache for Memory Transfers for a Video Processor", U.S. Appl. No. 11/267,606, filed Nov. 4, 2005.
Karandikar, et al., Patent Application Entitled: "Command Acceleration in a Video Processor", U.S. Appl. No. 11/267,640, filed Nov. 4, 2005.
Karandikar, et al., Patent Application Entitled "A Configurable SIMD Engine in a Video Processor", U.S. Appl. No. 11/267,393, filed Nov. 4, 2005.
Karandikar, et al., Patent Application Entitled "Context Switching on a Video Processor Having a Scalar Execution Unit and a Vector Execution Unit", U.S. Appl. No. 11/267,778, filed Nov. 4, 2005.
Lew, et al., Patent Application Entitled "Multi Context Execution on a Video Processor", U.S. Appl. No. 11/267,780, filed Nov. 4, 2005.
Su, Z, et al., Patent Application Entitled: "State Machine Control for a Pipelined L2 Cache to Implement Memory Transfers for a Video Processor", U.S. Appl. No. 11/267,119, filed Nov. 4, 2005.
Kozyrakis, "A Media enhanced vector architecture for embedded memory systems," Jul. 1999, http://digitalassets.lib.berkeley.edu/techreports/ucb/text/CSD-99/1059.pdf.

(56) References Cited

OTHER PUBLICATIONS

HPL-PD A Parameterized Research Approach—May 31, 2004 http://web.archive.org/web/*/www.trimaran.org/docs/5_hpl-pd.pdf.
gDEBugger, graphicREMEDY, http://www.gremedy.com, Aug. 8, 2006.
Duca et al., A Relational Debugging Engine for Graphics Pipeline, International Conference on Computer Graphics and Interactive Techniques, ACM SIGGRAPH 2005, pp. 453-463, ISSN:0730-0301.
Parhami, Behrooz, Computer Arithmetic: Algorithms and Hardware Designs, Oxford University Press 2000, pp. 413-418, ISBN:0-19-512583-5.
Karandikar et al., Patent Application Entitled A Pipelined L2 Cache for Memory Transfers for A Video Processor:, U.S. Appl. No. 11/267,606, filed Nov. 4, 2005.
Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. SOC, US, Feb. 3, 1996, pp. 281-290, XP01 0162067. DOI: 10.11 09/HPCA, 1996.501193 ISBN: 978-0-8186-7237-8.
Defintion of "Slot," http://www.thefreedictionary.com/slot, Oct. 2, 2012.
Intel, Intel Architecture Software Deveopler's Manual, vol. 1: Basic Architecture 1997 p. 8-1.
Intel, Intel Architecture Software Deveopler's Manual, vol. 1: Basic Architecture 1999 p. 8-1, 9-1.
Intel, Intel Pentium III Xeon Processor at 500 and 550Mhz, Feb. 1999.
Free On-Line Dictionary of Computing (FOLDOC), defintion of "video", from foldoc.org/index.cgi?query=video&action=Search, May 23, 2008.
FOLDOC, definition of "frame buffer", from foldoc.org/index.cgi?query=frame+buffer&action=Search, Oct. 3, 1997.
PCreview, article entitled "What is a Motherboard", from www.pcreview.co.uk/articles/Hardware/What_is_a_Motherboard., Nov. 22, 2005.
FOLDOC, definition of "motherboard", from foldoc.org/index.cgi?query=motherboard&action=Search, Aug. 10, 2000.
FOLDOC, definition of "separate compilation", from foldoc.org/index.cgi?query=separate+compilation&action=Search, Feb. 19, 2005.
FOLDOC, definition of "vector processor", http://foldoc.org/, Sep. 11, 2003.
Wikipedia, defintion of "vector processor", http://en.wikipedia.org/, May 14, 2007.
Fisher, Joseph A., Very Long Instruction Word Architecture and the ELI-512, ACM, 1993, pp. 140-150.
FOLDOC (Free On-Line Dictionary of Computing), defintion of X86, Feb. 27, 2004.
FOLDOC, definition of "superscalar," http://foldoc.org/, Jun. 22, 2009.
FOLDOC, definition of Pentium, Sep. 30, 2003.
Wikipedia, definition of "scalar processor," Apr. 4, 2009.
Intel, Intel MMX Technology at a Glance, Jun. 1997.
Intel, Pentium Processor Family Developer's Manual, 1997, pp. 2-13.
Intel, Pentium processor with MMX Technology at 233Mhz Performance Brief, Jan. 1998, pp. 3 and 8.
Wikipedia, entry page defining term "SIMD", last modified Mar. 17, 2007.
FOLDOC, Free Online Dictionary of Computing, defintion of SIMD, foldoc.org/index.cgi?query=simd&action=Search, Nov. 4, 1994.
Definition of "queue" from Free on-Line Dictionary of Computing (FOLDOC), http://folddoc.org/index.cgi?query=queue&action=Search, May 15, 2007.
Definition of "first-in first-out" from FOLDOC, http://foldoc.org/index.cgi?query=fifo&action=Search, Dec. 6, 1999.
Definition of "block" from FOLDOC, http://foldoc.org/index.cgi?block, Sep. 23, 2004.
Quinnell, Richard A. "New DSP Architectures Go "Post-Harvard" for Higher Performance and Flexibility" Techonline; posted May 1, 2002.
Wikipedia, definition of Multiplication, accessed from en.wikipedia.org/w/index.php?title=Multiplication&oldid=1890974, published Oct. 13, 2003.
Rosenberg, Jerry M.; Dictionary of Computers, Information Processing & Telecommunications, 2nd edition; John Wiley & Sons, 1987, 4 pages.

\* cited by examiner

ADDRESS INDEPENDENT SHADER PROGRAM LOADING

FIELD OF THE INVENTION

The present invention is generally related to programming graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data. Generally, the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

In modern real-time 3-D graphics rendering, the functional units of the GPU need to be programmed in order to properly execute many of the more refined pixel shading techniques. These techniques require, for example, the blending of colors into a pixel in accordance with factors in a rendered scene which affect the nature of its appearance to an observer. Such factors include, for example, fogginess, reflections, light sources, and the like. In general, several graphics rendering programs (e.g., small specialized programs that are executed by the functional units of the GPU) influence a given pixel's color in a 3-D scene. Such graphics rendering programs are commonly referred to as shader programs, or simply shaders. In more modern systems, some types of shaders can be used to alter the actual geometry of a 3-D scene (e.g., Vertex shaders) and other primitive attributes.

In a typical GPU architecture, each of the GPU's functional units is associated with a low level, low latency internal memory (e.g., register set, etc.) for storing instructions that programmed the architecture for processing the primitives. The instructions typically comprise a shader programs and the like. The instructions are loaded into their intended GPU functional units by propagating them through the pipeline. As the instructions are passed through the pipeline, when they reach their intended functional unit, that functional unit will recognize its intended instructions and store them within its internal registers.

Prior to being loaded into the GPU, the instructions are typically stored in system memory. Because the much larger size of the system memory, a large number of shader programs can be stored there. A number of different graphics processing programs (e.g., shader programs, fragment programs, etc.) can reside in system memory. The programs can each be tailored to perform a specific task or accomplish a specific result. In this manner, the graphics processing programs stored in system memory act as a library, with each of a number of shader programs configured to accomplish a different specific function. For example, depending upon the specifics of a given 3-D rendering scene, specific shader programs can be chosen from the library and loaded into the GPU to accomplish a specialized customized result.

The graphics processing programs, shader programs, and the like are transferred from system memory to the GPU through a DMA (direct memory access) operation. This allows GPU to selectively pull in the specific programs it needs. The GPU can assemble an overall graphics processing program, shader, etc. by selecting two or more of the graphics programs in system memory and DMA transferring them into the GPU.

There are problems with conventional GPU architectures in selectively assembling more complex graphics programs, shader programs, or the like from multiple subprograms. In general, it is advantageous to link two or more graphics programs together in order to implement more complex or more feature filled render processing. A problem exists however, in that in order to link multiple graphics processing programs together, the addressing schemes of the programs need to properly refer to GPU memory such that the two programs execute as intended. For example, in a case where two shader programs are linked to form a longer shader routine, the first shader address mechanism needs to correctly reference the second shader address mechanism. Additionally, both shader address mechanisms need to properly and coherently referred to the specific GPU functional units and/or registers in which they will be stored. This can involve quite a bit of overhead in those cases where there are many different graphics programs stored in system memory and a given application wants to be able to link multiple programs in a number of different orders, combinations, total lengths, and the like.

The programs in system memory have no way of knowing the order in which they will be combined, the number of them there will be in any given combination, or whether they will be combined at all. Due to the real time rendering requirements, the configurations of the combinations need to be determined on-the-fly, and need to be implemented as rapidly as possible in order to maintain acceptable frame rates. It is still desirable to DMA transfer the programs from the system memory to the GPU (e.g., on an as needed basis). In order to facilitate DMA transfers, the desired programs need to be modified to properly point to their respective correct addresses and to properly order themselves for execution with the various functional units of the GPU. Unfortunately, this results in a large number of read-modify-write operations (e.g., R-M-W), where the program must be read, their address mechanisms altered such that the individual instructions comprising each program correctly match their intended functional units and registers, and written back to system memory. Only after the required R-M-W operations have been completed can the desired programs be DMA transferred into the GPU. This results in a large amount of undesirable processor overhead.

The increased overhead proves especially problematic with the ability of prior art 3-D rendering architectures to scale to handle the increasingly complex 3-D scenes of today's applications. Scenes now commonly contain hundreds of programs each consisting of up to hundreds of instructions. Thus, a need exists for program loading process that can scale as graphics application needs require and provide added performance without incurring penalties such as increased processor overhead.

SUMMARY OF THE INVENTION

Embodiments of the present invention provide a method and system for loading graphics rendering programs that can scale as graphics application needs require without incurring penalties such as excessive data transfer overhead.

In one embodiment, the present invention is implemented as method for loading a shader program from system memory into GPU memory. The method includes accessing the shader program in system memory of a computer system. The GPU then performs a DMA transfer of the shader program from system memory into GPU memory. The DMA transfer is implemented such that the shader program is loaded into GPU memory in an address-independent manner. In one embodiment, the shader program stored in system memory does not include an explicit address (e.g., does not include an address that references a storage location within the GPU memory).

In one embodiment, multiple shader programs reside in system memory of the computer system. Two or more of the shader programs are accessed and respective DMA transfers of the shader programs from system memory into GPU memory are performed such that each of the shader programs are loaded into GPU memory in an address-independent manner. Each of the shader programs are linked for sequential execution (e.g., where two or more shader programs are linked to implement more complex rendering, etc.) by the GPU.

In one embodiment, an offset value can be written into the GPU memory (e.g., by the graphics driver) to indicate an address where the first shader program is to be stored. Subsequently, from the first instruction of the first shader program to a last instruction of the last of the shader program, each instruction is loaded sequentially from the offset value address to successively incremented addresses of the GPU memory. The sequential loading of each instruction from the offset value can link each of the shader programs for sequential execution by the GPU (e.g., multiple shader programs that implement more complex rendering, etc.).

In this manner, embodiments of the present invention implement a program loading process that can scale as graphics application needs require and provide added performance without incurring penalties such as increased processor overhead. Since the shader programs do not include explicit addresses to GPU memory, they can be DMA transferred from system memory into GPU memory, for example, on an as needed basis, without requiring any explicit address Read-modify-write updating, thereby greatly reducing program loading overhead.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
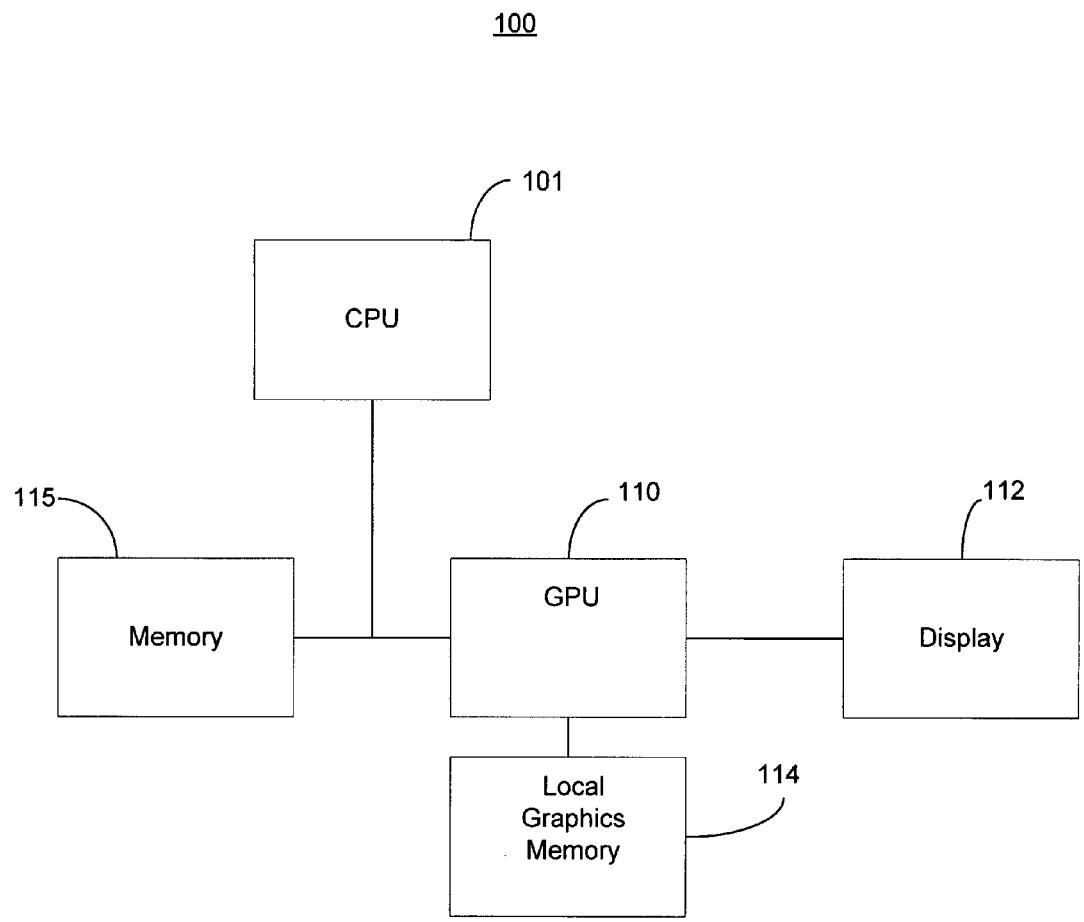
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown), or within the integrated circuit die of a PSOC (programmable system-on-a-chip). Additionally, a local graphics memory 114 can be included for the GPU 110 for high bandwidth graphics data storage.

EMBODIMENTS OF THE INVENTION

Embodiments of the present invention provide a method and system for loading graphics rendering programs that can scale as graphics application needs require without incurring penalties such as excessive data transfer overhead. In one embodiment, the present invention is implemented as a computer implemented method (e.g., system 100 of FIG. 1) for loading a shader program from system memory (e.g., system memory 115) into GPU memory (e.g., within instruction registers internal to the GPU 110). The method includes accessing the shader program in system memory 115 of the computer system 100. The GPU 110 then performs a DMA transfer of the shader program from system memory 115 into internal memory (e.g., instruction registers) internal to the GPU 110. The DMA transfer is implemented such that the shader program is loaded into GPU 110 internal memory in an address-independent manner. In one embodiment, the shader program stored in system memory does not include an explicit address. For example, the shader program does not include addresses that references a storage locations, instruction registers, or the like, within the GPU 110. Embodiments of the present invention and their benefits are further described below.

Figure 2:
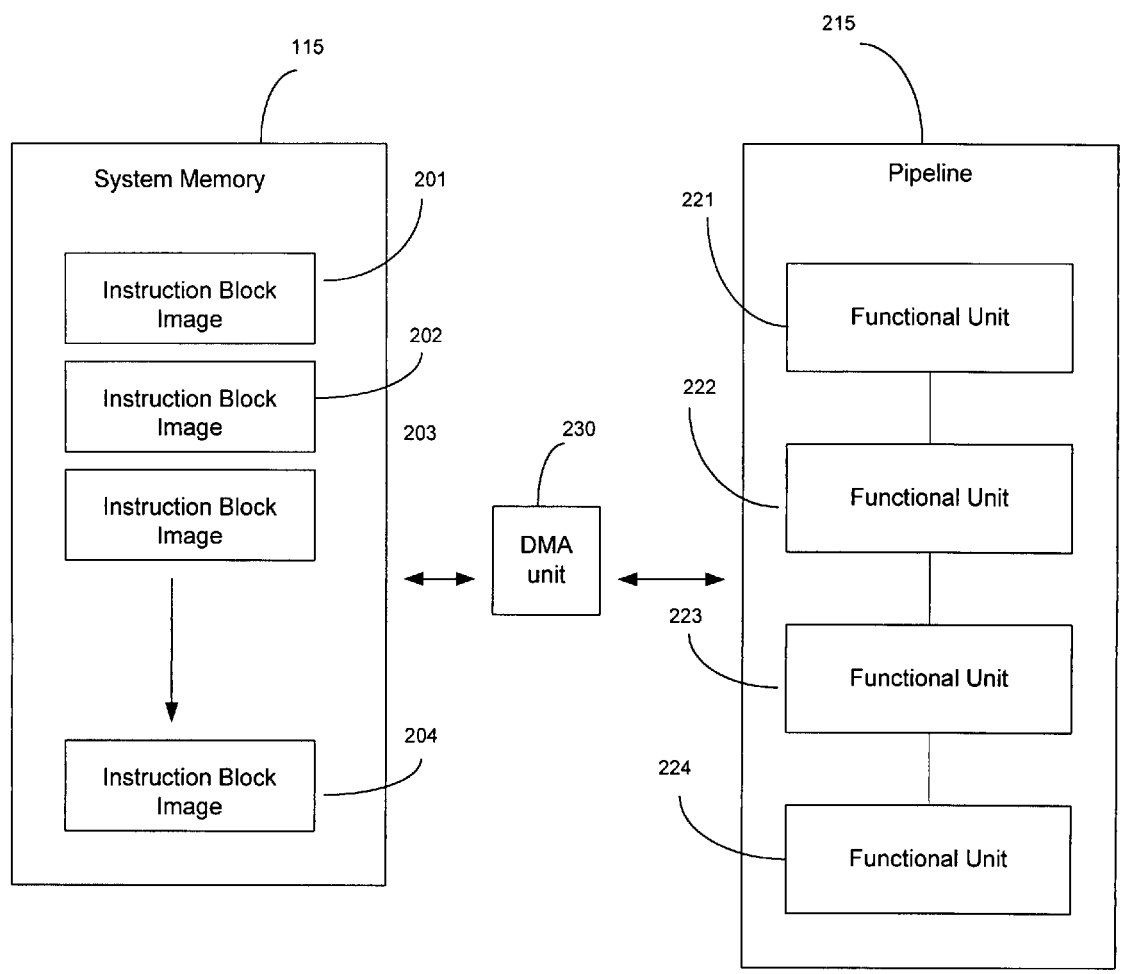
FIG. 2 shows a diagram of the system memory and a plurality of functional units of a graphics pipeline in accordance with one embodiment of the present invention.

FIG. 2 shows a diagram of the system memory 115 and a plurality of functional units 221-224 of a graphics pipeline 215 in accordance with one embodiment of the present invention. As depicted in FIG. 2, the system memory 115 includes a plurality of instruction block images 201-204. The functional units 221-224 are typical functional units of the 3-D graphics rendering pipeline 215 (e.g., setup unit, raster unit, texturing unit, etc.). The 3-D graphics rendering pipeline 215 comprises a core component of the GPU 110.

The FIG. 2 embodiment shows the plurality of instruction block images 201-204 that can be DMA transferred into the pipeline 215 for use by one or more of the functional units 221-224. The instruction block images 201-204 are configured to implement particular graphics rendering functions. They are stored within the system memory 115 and are DMA transferred, via the DMA unit 230, when they are needed to perform graphics rendering operations for a graphics application executing on the GPU 110.

Each of the instruction block images 201-204 comprise a graphics rendering program that programs the hardware components of, for example, a functional unit 222 (e.g., a raster unit, etc.) to perform a graphics rendering operation. A typical instruction block image (e.g., instruction block image 201) comprises a number of instructions. The instruction block images are stored in system memory 115 and are maintained there until needed by a graphics application executing on the GPU 110. The instructions that comprise a given instruction block image are usually specifically tailored for use with a specific functional unit of the pipeline 215. Each of the functional units 221-224 can have multiple designated instruction block images within the system memory 115. Thus, an instruction block image can be a shader program (e.g., Vertex shader, texture shader, geometry shader, etc.), or the like. Although the discussions which follow often use the term "shader" or "shader program", it should be understood that this term can refer to a graphics rendering program other than a shader program (e.g., set up, transform and lighting, rasterization, etc.).

FIG. 2 depicts the system memory 115 as storing a number of instruction block images, such as the instruction block images 201-203, extending to the instruction block image 204. Thus the FIG. 2 indicates that a large number of instruction block images can be stored within the system memory 115 (e.g., 50 instruction block images, 200 instruction block images, or more). The large number of different instruction block images allows flexibility in fashioning specific graphics rendering routines that are particularly suited to the needs of a graphics application. For example, complex rendering routines can be fashioned by arranging multiple smaller rendering programs to execute in a coordinated fashion (e.g., arranging two or more shader programs to execute sequentially one after the other). Alternatively, for example, hardware resource utilization of a given functional unit can be improved by executing certain shader programs one after another in order to best utilize parallel execution resources of the functional unit. In this manner, a diverse population of instruction block images provides flexibility and a readily configurable mechanism for optimizing the operation of the functional units 221-224 of the pipeline 215.

A graphics driver executing on the CPU 101 functions by configuring and programming the GPU 110 for operation. The programming occurs in response to the particular requirements of a given graphics rendering application (e.g., real-time 3-D rendering application) executing on the computer system 100. In support of a typical application, the graphics driver causes a certain number of the instruction block images 201-204 to be DMA transferred into the pipeline 215 when needed to program the functional units 221-224. The DMA unit 230 is configured to implement the DMA transfers. The DMA unit 230 is typically a component included within the GPU 110.

During a programming operation, selected instruction block images are DMA transferred into the pipeline 215. The instructions comprising each shader program then propagate "down" the pipeline 215 until they reach their intended functional unit. Each of the functional units 221-224 include hardware which recognizes instructions intended for itself. For example, when a functional unit near the "top" of the pipeline 215 (e.g., functional unit 221) recognizes shader program instructions intended for itself, it loads the instructions into its coupled instruction memory (e.g., shown in FIG. 3 below), while ignoring instructions that are not intended for itself (e.g., by letting the instructions propagate further down the pipeline 215).

Figure 3:
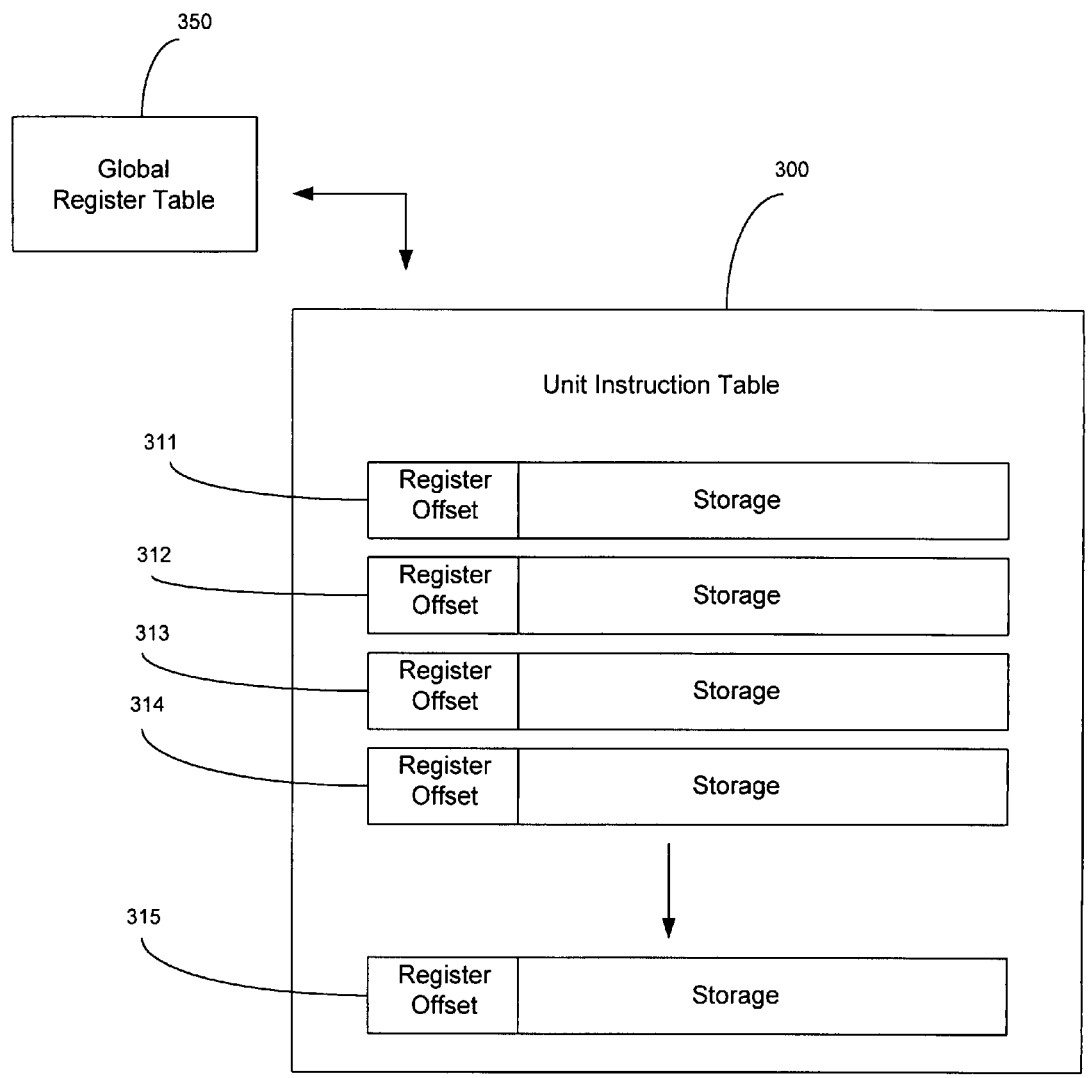
FIG. 3 shows a diagram of an instruction unit table and a global register table in accordance with one embodiment of the present invention.

FIG. 3 shows a diagram of an instruction unit table 300 and a global register table 350 in accordance with one embodiment of the present invention. As depicted in FIG. 3, the instruction unit table 300 includes a plurality of storage registers 311-315. Each of the storage registers 311-315 include a register offset portion and a storage portion as shown.

The FIG. 3 embodiment shows the configuration of the instruction unit table 300 that functions as the low-level, low latency memory for a functional unit. In one embodiment, each functional unit 221-224 has its own respective instruction unit table (e.g., such as table 300). The table 300 is used to store the shader program instructions from the instruction block images. The table 300 explicitly shows the storage registers 311-314, extending onwards to the storage register 315, thus indicating the table 300 can include a large number of storage registers.

The hardware of a given functional unit accesses its instruction unit table to execute any of a number of different shader programs that may be stored therein. As described above, these instructions program the hardware components of the particular functional unit. This enables that functional unit to operate as intended on the data that subsequently flows down the pipeline 215.

In a typical programming operation, as described above, the instruction block images are DMA transferred from system memory 115 into instruction unit tables (e.g., GPU memory) such that each of the shader programs are loaded into instruction unit tables in an address-independent manner, and such that the shader programs are linked for sequential execution. As used herein, the term "address independent" refers to the fact that the contents of the shader programs do not depend on where in the instruction register tables (e.g., register address) they will be loaded. For example, in a case where two shader programs are combined to implement a specific rendering routine, the instructions comprising the first shader program can be loaded in an upper portion of the instruction unit table 300 and the instructions comprising the second shader program can be loaded in successive portion of the unit table 300. Thus, for example, the first instruction of the first shader program can be loaded at register 0, and have its instructions sequentially loaded thereon to, for example, register 16, and the second shader program can have its first instruction loaded at register 17 and each subsequent instruction sequentially loaded thereon to, for example, register 23. Then, when the functional unit coupled to the instruction unit table 300 executes its rendering routine (e.g., to perform complex shading, etc.), it will execute the first instruction at register 0, and each subsequent instruction until it executes the last instruction at register 23.

In one embodiment, when shader programs are loaded into the instruction unit table 300, the shader programs are loaded in accordance with an offset value that is written into the instruction unit table 300. The offset value indicates the register at which the first instruction of the first shader program is to be stored. Thus, for example, in a case where three shader programs are to be stored within the instruction unit table 300, an offset value can be written to one of the registers of the table 300 indicating that designated register is to be the start location of the sequential instruction loading. This causes the first instruction of the first shader program to be loaded at the designated register, and each subsequent instruction of the first shader program, through the instructions of the second shader program, and to the last instruction of the third shader program to be sequentially loaded from the designated register onwards. In this manner, the destination addresses of the store operations are automatically incremented as each successive instruction is loaded into the table 300. In other words, each instruction is sequentially stored from the address indicated by the offset value to successively incremented addresses of the table 300 (e.g., GPU memory).

As described above, the instructions of the instruction unit table 300 are executed sequentially by the coupled functional unit. Thus, in keeping with the above described example where three shader programs are linked, the register addresses where the shader programs are stored sequentially extend from a first address (e.g., indicated by the offset value) to a last address (e.g., were the last instruction of the third shader is stored). The function unit executes the rendering routine from this first address through this last address.

The global register table 350 is configured to enable a plurality of offset values to be written into multiple instruction unit tables of the pipeline 215. This is implemented by accessing a global register (within the table 350) that aliases a plurality of memory locations of the GPU memory. For example, the global register table 350 can be configured to alias to each of the instruction unit tables (e.g., table 300) of each of the functional units 221-224 of the pipeline 215. This enables, for example, a common offset value to be written simultaneously to each of the instruction unit tables. In this manner, the plurality of memory locations aliased by the global register table 350 are configured such that data can be efficiently written to a corresponding plurality of functional units of the GPU.

Figure 4:
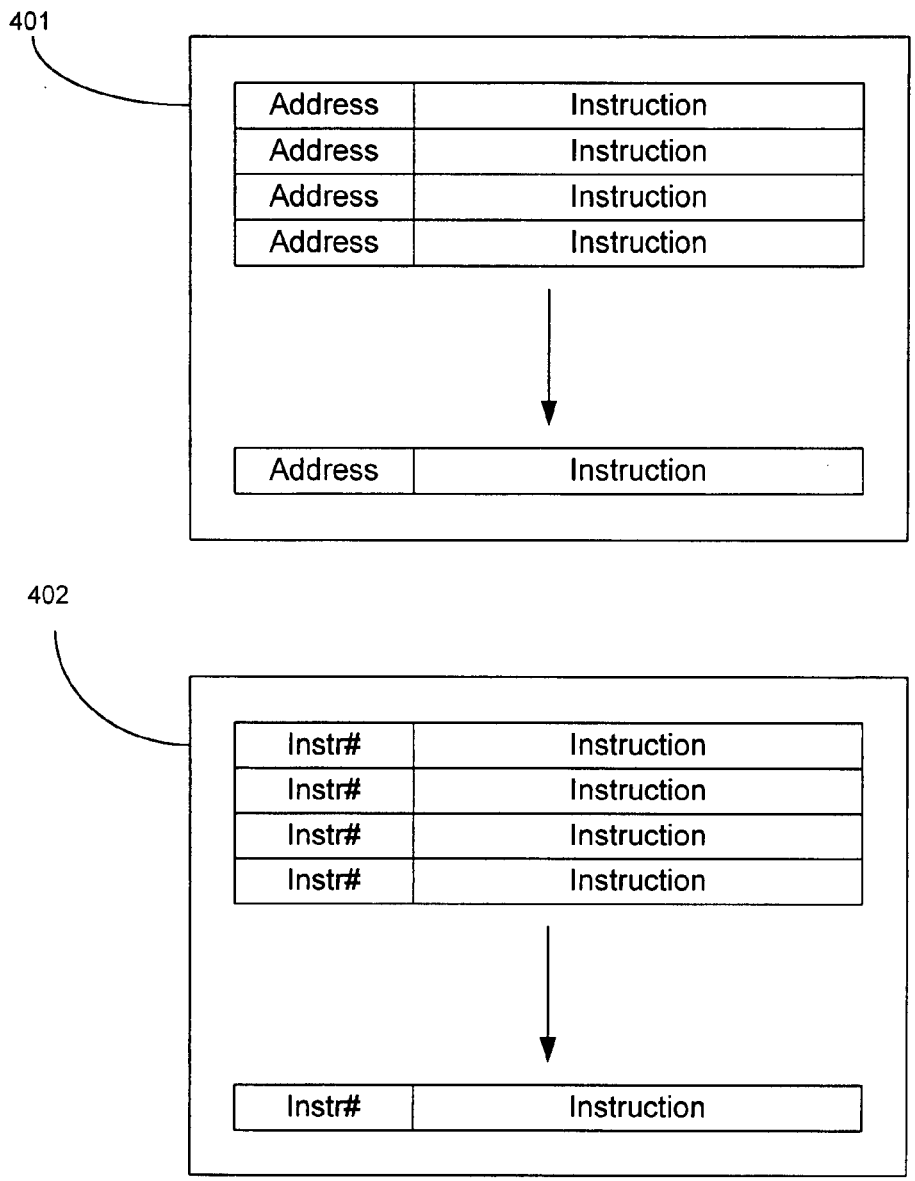
FIG. 4 shows a diagram of a conventional instruction block image which is shown in contrast with an instruction block image in accordance with embodiment of the present invention.

FIG. 4 shows a diagram of a conventional instruction block image 401 which is shown in contrast with an instruction block image 402 in accordance with one embodiment of the present invention. As depicted in FIG. 4, the conventional instruction block image 401 contains a plurality of instructions, where each instruction has an explicit address portion and an instruction portion as shown. The instruction block image 402 contains a plurality of instructions, where each instruction merely includes a number portion and an instruction portion as shown.

As described above, the loading of each instruction sequentially from the address indicated by the offset value links each of the shader programs for sequential execution by the GPU. This attribute holds true irrespective of where within the system memory 115 the instruction block images corresponding to the shader programs were stored. Additionally, since the instructions comprising the shader programs do not have an actual address until they are stored within the table 300, the shader programs stored in system memory (e.g., the instruction block images) do not require explicit addresses. This aspect is depicted by the instruction block image 402 which, in accordance with embodiment of the present invention, does not have explicit addresses.

In contrast, in the prior art, the conventional instruction block image 401 has a specific address for each of the instructions comprising the instruction block. Each of the instructions has an address that references a corresponding register of a conventional GPU. These addresses are used by the conventional GPU to direct the instructions of the instruction block image to their correct storage location, and they must be each updated through time-consuming read-modify-write operations in order to implement valid combinations. Such explicit addresses are not necessary with the instruction block image 402.

Figure 5:
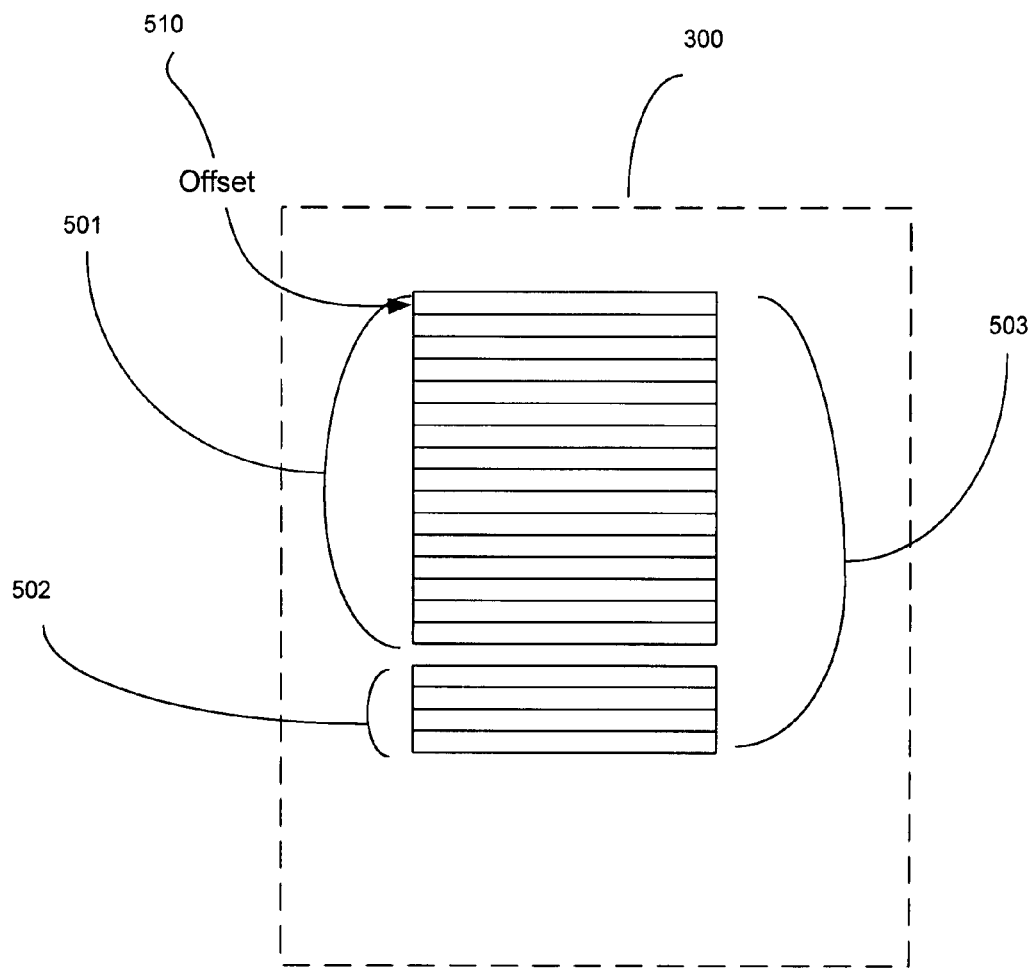
FIG. 5 shows a diagram illustrating an example where two shader programs are linked to implement a resulting complex rendering routine in accordance with one embodiment of the present invention.

FIG. 5 shows a diagram illustrating an example where two shader programs 501 and 502 are linked to implement a resulting complex rendering routine 503 in accordance with one embodiment of the present invention. As described above, the instructions comprising the first shader program 501 are loaded in an upper portion of the instruction unit instruction table 300, starting with the register indicated by the offset value 510. The instructions comprising the second shader program 502 loaded in a successive portion of the unit instruction table 300. Thus, as illustrated, the first instruction of the first shader program 501 is loaded at the register addressed by the offset value, and the rest of the instructions are sequentially loaded from there on. Subsequently, when the complex rendering routine 503 is executed (e.g., to perform complex shading, etc.), it will execute the first instruction onwards to the final instruction.

In this manner, embodiments of the present invention implement a program loading process that can scale as graphics application needs require and provide added performance without incurring penalties such as increased processor overhead. Since the shader programs do not include explicit addresses to GPU memory, they can be DMA transferred from system memory into GPU memory, for example, on an as needed basis, without requiring any explicit address read-modify-write updating, thereby greatly reducing program loading overhead.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for loading a shader program, comprising:
accessing a plurality of address independent shader programs in system memory of a computer system;
writing a plurality of offset values into a GPU memory by accessing a global register table that aliases a plurality of memory locations of the GPU memory corresponding to each of a plurality of instruction unit tables of a plurality of functional units of a pipeline, to enable an offset value to be written simultaneously to each of the plurality of instruction unit tables; and
wherein the offset value indicates where the first shader program is to be stored, and, from a first instruction of a first of the plurality of shader programs to a last instruction of a last of the plurality of shader programs, loading each instruction sequentially from an address indicated by the offset value to successively incremented addresses of the GPU memory;
performing a respective plurality of DMA transfers of each of the shader programs from system memory into GPU memory such that each of the shader programs are loaded into GPU memory in an address-independent manner.

2. The method of claim 1, wherein the shader programs stored in system memory do not include an explicit address, and wherein the GPU memory comprises a plurality of registers of each functional unit of the GPU.

3. The method of claim 1,
wherein each of the shader programs are linked for sequential execution by the GPU.

4. The method of claim 3, wherein the loading of each instruction sequentially from the address indicated by the offset value links each of the shader programs for sequential execution by the GPU.

5. The method of claim 3, wherein the shader programs stored in system memory do not include an explicit address.

6. The method of claim 1, wherein a plurality of 32-bit shader program data registers are included in the GPU for storing multiple shader program instructions per data register, and wherein the multiple shader program instructions can be transferred in from system memory on a one instruction per data register basis or on a multiple instruction per data register basis.

7. A GPU (graphics processor unit), the GPU including:
a DMA engine for accessing a plurality of address independent shader programs in system memory of a computer system;
a graphics driver writes a plurality of offset values into a GPU memory by accessing a global register table that aliases a plurality of memory locations of the GPU memory corresponding to each of a plurality of instruction unit tables of a plurality of functional units of a pipeline, to enable an offset value to be written simultaneously to each of the plurality of instruction unit tables; and
wherein the offset value indicates where the first shader program is to be stored, and, from a first instruction of a first of the plurality of shader programs to a last instruction of a last of the plurality of shader programs, loading each instruction sequentially from an address indicated by the offset value to successively incremented addresses of the GPU memory;
the DMA engine performs a respective plurality of DMA transfers of each of the shader programs from system memory into GPU memory such that each of the shader programs are loaded into GPU memory in an address-independent manner.

8. The GPU of claim 7, wherein the shader programs stored in system memory do not include an explicit address, and wherein the GPU memory comprises a plurality of registers of each functional unit of the GPU.

9. The GPU of claim 7, wherein each of the shader programs are linked for sequential execution by the GPU.

10. The GPU of claim 9, wherein the loading of each instruction sequentially from the address indicated by the offset value links each of the shader programs for sequential execution by the GPU.

11. The GPU of claim 10, wherein the shader programs stored in system memory do not include an explicit address.

12. The GPU of claim 7, wherein a plurality of 32-bit shader program data registers are included in the GPU for storing multiple shader program instructions per data register, and wherein the multiple shader program instructions can be transferred in from system memory on a one instruction per data register basis or on a multiple instruction per data register basis.

13. A computer system, comprising:
a system memory;
a CPU coupled to the system memory; and a GPU communicatively coupled to the CPU, the GPU including a DMA engine for accessing a plurality of address independent shader programs in system memory of a computer system;

a graphics driver writes a plurality of offset values into a GPU memory by accessing a global register table that aliases a plurality of memory locations of the GPU memory corresponding to each of a plurality of instruction unit tables of a plurality of functional units of a pipeline, to enable an offset value to be written simultaneously to each of the plurality of instruction unit tables; and wherein the offset value indicates where the first shader program is to be stored, and, from a first instruction of a first of the plurality of shader programs to a last instruction of a last of the plurality of shader programs, loading each instruction sequentially from an address indicated by the offset value to successively incremented addresses of the GPU memory;

the DMA engine performs a respective plurality of DMA transfers of each of the shader programs from system memory into GPU memory such that each of the shader programs are loaded into GPU memory in an address-independent manner.

14. The computer system of claim 13, wherein the DMA engine transfers the plurality of shader programs into the plurality of register instruction tables; and each of the shader programs are linked for sequential execution by the GPU.

* * * * *